United States Patent [19]
Kaneko

[11] Patent Number: 5,129,200
[45] Date of Patent: Jul. 14, 1992

[54] PARTITION APPARATUS FOR OA OFFICE

[75] Inventor: Yutaka Kaneko, Yokohama, Japan

[73] Assignee: Ricoh Company, Ltd., Tokyo, Japan

[21] Appl. No.: 534,266

[22] Filed: Jun. 7, 1990

[30] Foreign Application Priority Data

Jun. 12, 1989 [JP] Japan ............................ 1-68470
Jun. 13, 1989 [JP] Japan ............................ 1-68689
Jun. 20, 1989 [JP] Japan ............................ 1-72044

[51] Int. Cl.$^5$ ............................................. E06B 1/04
[52] U.S. Cl. ............................................. 52/205; 52/220; 52/239
[58] Field of Search ............... 52/36, 238.1, 243.1, 52/239, 204, 582, 205, 206, 220, 221; 312/242

[56] References Cited

U.S. PATENT DOCUMENTS

| | | | |
|---|---|---|---|
| 4,663,895 | 5/1987 | Brice | 52/239 |
| 4,876,835 | 10/1989 | Kelley et al. | 52/36 |
| 4,914,873 | 4/1990 | Newhouse | 52/36 |

FOREIGN PATENT DOCUMENTS 62-2320 3/1986 Japan.
6322714 5/1990 Japan.

*Primary Examiner*—David A. Scherbel
*Assistant Examiner*—Kien Nguyen
*Attorney, Agent, or Firm*—Oblon, Spivak, McClelland, Maier & Neustadt

[57] ABSTRACT

A partition apparatus for an OA office has a partition panel; a side plate disposed on a front face of the partition panel; a side plate disposed on a rear face of the partition panel; and a device for building a business machine in the partition panel in a suitable position thereof. An electronic business machine such as a keyboard operated on a desk can be easily attached and detached from a housing space portion of the partition panel. An office automation equipment for feeding a sheet of paper may be arranged and built in the partition panel so as to feed the sheet of paper from above to below. Functions of the office automation equipment are respectively constructed by modules independently detached from the partition apparatus. A portion of the partition panel falls forward and is engaged therewith in a horizontal direction approximately perpendicular to the partition panel. Another office automation equipment may be fixed to the partition panel and housed within the partition apparatus when the partition panel is returned to its original position so as to form a planar face.

8 Claims, 8 Drawing Sheets

PARTITION APPARATUS FOR OA OFFICE

BACKGROUND OF THE INVENTION

1. Field of the Invention

The present invention relates to a partition apparatus for building-in an office automation equipment and applied to a work station for an office having a partition panel for example.

2. Description of the Related Art

A general technique of such a partition apparatus is shown in e.g., Japanese Utility Model Application Laying Open (KOKAI) No. 62-2320. In this Japanese laid-open publication, an outlet box for signal lines is attached into a groove of a receiving member formed in the shape of a groove in cross section and fitted and fixed to an opening for a duct disposed in a panel in a suitable position thereof. A duct section covered by a duct cover on a surface thereof is disposed by connecting signal lines supplied from the interior of the panel with each other. A plug socket section covered by a cover on a surface thereof is disposed and has a plug socket box inside a panel above the duct section.

In such a technique, even when a desk provided with an electronic business machine is arranged near any panel, the electronic business machine on the desk can be turned on by the plug socket section and the outlet box wired and arranged in advance in the panel. Further, the business machine can be electrically connected to the other electronic business machines by only connecting connection terminals of the business machines to each other. Such a wiring panel apparatus simply has the plug socket section for turning on the power of the business machine, or passages for housing electric cords for the connection of the other electronic business machines. Accordingly, it is necessary to set or house connection wiring each time when the electronic business machines, etc. are arranged or removed. However, after the electronic business machine such an office automation equipment has been arranged on the desk, a desk face is occupied by the electronic business machine when no office automation operation is performed such as reading, thinking, etc. Therefore, when the business machine is not used, no space is effectively utilized and the business machine is an obstacle to a user and prevents an operation which does not relate to the office automation operation.

SUMMARY OF THE INVENTION

It is therefore a first object of the present invention to provide a partition apparatus for an OA office in which an electronic business machine such as a keyboard, a display, a disk drive unit, a telephone in the OA office are built in a partition panel device.

A second object of the present invention is to provide a partition apparatus for an OA office in which an electronic business machine operated on a desk is easily attached and detached from the apparatus and the driving operation of a disk drive unit is easily released at the arranging and housing times thereof and an electrical connection of the drive unit is easily performed by building an equipment using an office automation system in the partition apparatus.

A third object of the present invention is to provide a partition apparatus for building-in an office automation equipment such as an image scanner, a printer, a facsimile, etc.

A fourth object of the present invention is to provide a partition apparatus in which the apparatus is arranged in consideration of the conveyance of a sheet of paper; the conveyance of the sheet of paper can be seen without opening a building-in section; each of functions of an office automation equipment is provided by a module to easily take a jammed portion out of this equipment; or the module is constructed as an integrated unit to facilitate the replacement and assembly thereof.

A fifth object of the present invention is to provide a partition apparatus in which an office automation equipment arranged in a suitable position of the partition apparatus is used by pulling the office automation equipment down forward in accordance with necessity, and a panel pulled and falling forward is used as a base engaged and approximately perpendicular to a partition panel and a paper supplying guide is moved in a housing operation of the partition apparatus so as to come in close contact with a body thereof so that the partition apparatus can be thinly housed.

In a first embodiment of the present invention, the above objects can be achieved by a partition apparatus for an OA office comprising a partition panel; a side plate disposed on a front face of the partition panel; a side plate disposed on a rear face of the partition panel; and means for building a business machine in the partition panel in a suitable position thereof. An electronic business machine such as a keyboard operated on a desk can be easily attached and detached from a housing space portion of the partition panel. Further, a port for inserting a disk in a disk drive unit is disposed on a side of the space portion for housing the electronic business machine such as a keyboard operated on a desk. Further, when the electronic business machine such as a keyboard operated on the desk is housed into the housing space, the turning-on operation or driving operation of the business machine can be released by contact between a partition panel portion and a power or driving switch of the business machine. Further, devices using an office automation system such as a keyboard, a display, a disk drive unit, etc. are integrally built in the partition apparatus.

In a second embodiment of the present invention, an office automation equipment for feeding a sheet of paper is arranged and built in the partition panel so as to feed the sheet of paper from above to below. Functions of the office automation equipment are respectively constructed by modules independently detached from the partition apparatus. Further, sections for supplying and discharging a sheet of paper has a door opened from above. A portion of the door is formed as a transparent member or opening. Further, the respective modules are integrally constructed as a unit and are built in the partition apparatus.

In a third embodiment of the present invention, a portion of the partition panel falls forward and is engaged therewith in a horizontal direction approximately perpendicular to the partition panel. An office automation equipment is fixed to the partition panel and is housed within the partition apparatus when the partition panel is returned to its original position so as to form a planar face. Further, a horizontal position of the partition panel is higher than that of a roof panel of a desk for an office. Further, projecting portions of the office automation equipment fixed to the partition panel are folded when the partition panel is housed in the partition apparatus. Further, a turning-on operation of a power of the office automation equipment attached to the partition panel is released when the partition panel is housed in the partition apparatus.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a partition apparatus for an OA office in the present invention will next be described in detail with reference to the accompanying drawings.

Figure 1:
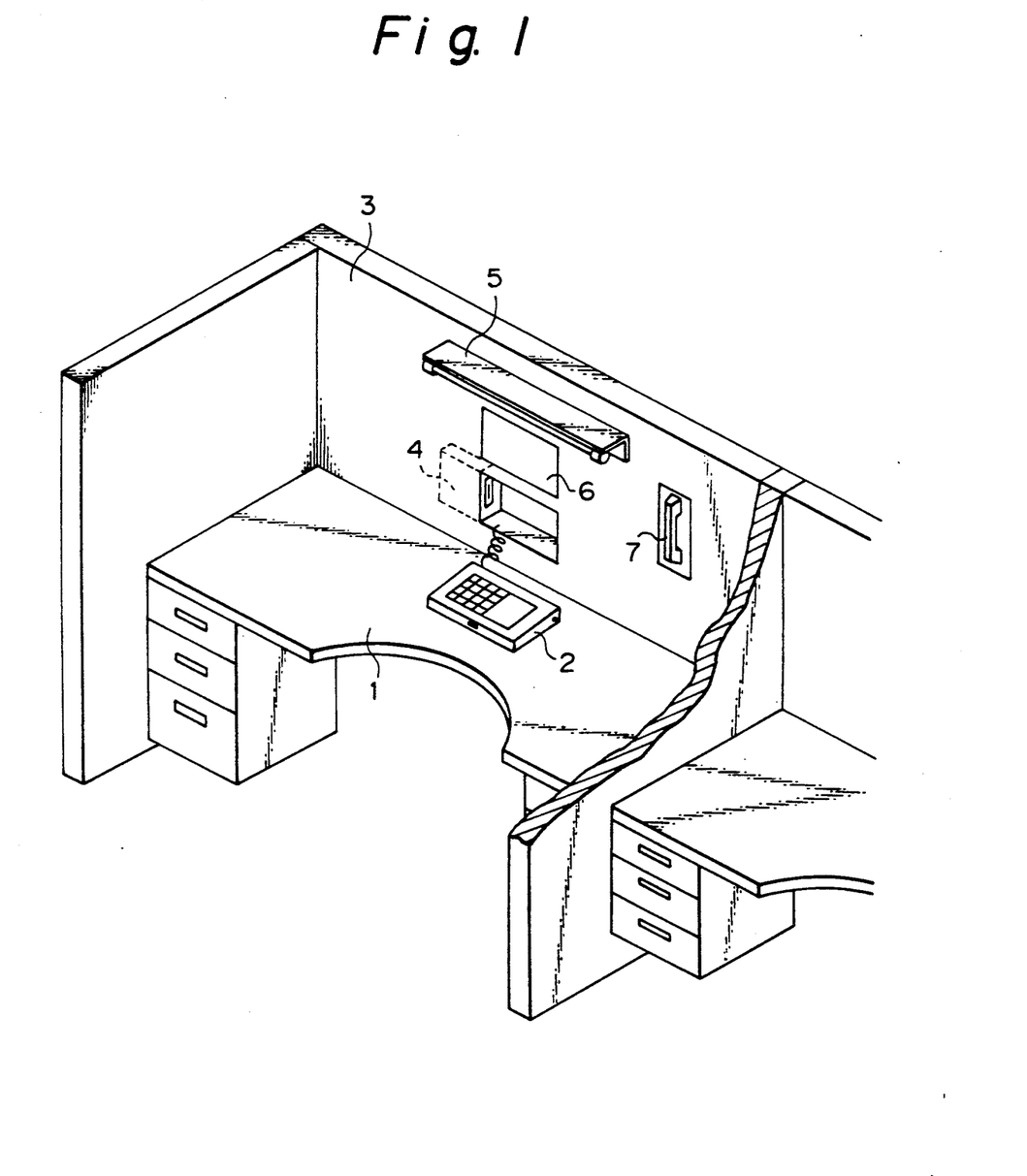
FIG. 1 is a view for explaining the construction of a partition apparatus for an OA office in a first embodiment of the present invention.

FIG. 1 is a view showing the construction of a partition apparatus for an OA office in a first embodiment of the present invention. In FIG. 1, reference numerals 1 to 7 respectively designate a desk, a keyboard, a partition panel, a disk drive unit, a fluorescent lamp, a flat display and a telephone. FIG. 1 shows a state in which the keyboard 2 is detached from the partition panel 3. The flat display 6 such as liquid crystal or plasma display, the disk drive unit 4, the telephone 7 such as a cordless telephone, etc. are built in the partition panel 3.

The thickness of the partition panel 3 is set to several cm. When the disk drive unit 4 is arranged in a direction perpendicular to the partition panel 3, it is necessary to increase the thickness of the partition panel 3 or project a portion of the partition panel corresponding to the disk drive unit 4. Therefore, no space cannot be effectively utilized and the appearance of the partition apparatus is injured or the partition apparatus is not easily conveyed.

Figure 2:
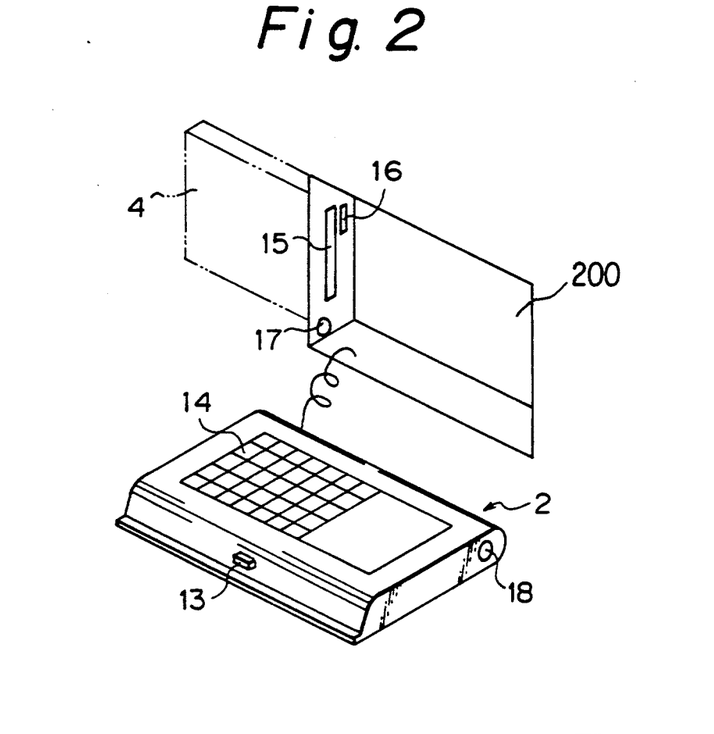
FIG. 2 is a partially enlarged view of a section for housing a keyboard.

FIG. 2 is a partially enlarged view of a section for housing the keyboard. In FIG. 2, reference numerals 13 to 18 respectively designate a locking button, a keyboard face, a disk insertion port, a release button, a pin and a recessed portion.

Figure 3:
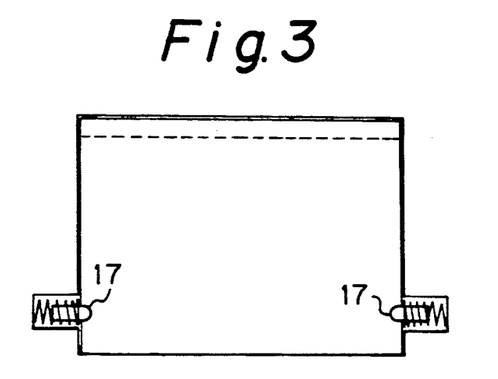
FIG. 3 is a view showing pins disposed in the keyboard housing section.

When the keyboard 2 is detached from the partition panel 3, the disk insertion port 15 of the disk drive unit 4 appears on a side of the housing section of the keyboard 2. The disk release button 16 is disposed in proximity to the disk insertion port 15 of the disk drive unit 4. When the keyboard 2 is housed, the keyboard 2 pushes the disk release button 16 so that the driving operation of a disk can be released at any time. In this position, a bottom surface of keyboard 2 serves as a first plate 210 which constructs a portion of partition panel 3. Thus, keyboard 2 is received in a housing space portion 200 formed between first plate 210 and a second plate 220. The keyboard 2 is attached and detached at a fulcrum provided by fitting the recessed portion 18 on each of both deeper sides of the keyboard 2 onto the pin 17 disposed in a corresponding position of the keyboard housing section of the partition panel and biased by a spring in advance. FIG. 3 shows an attaching state of the pin 17 in the partition panel.

Figure 4:
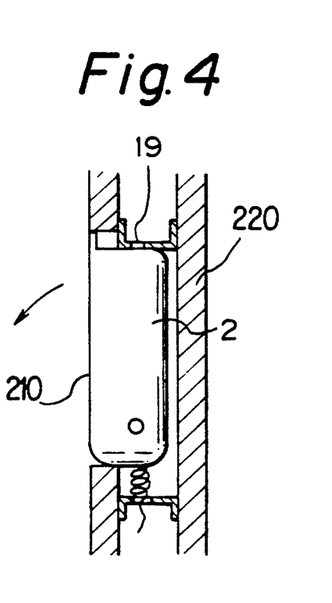
FIGS. 4 and 5 are views showing a state in which the keyboard is housed.
Figure 5A:
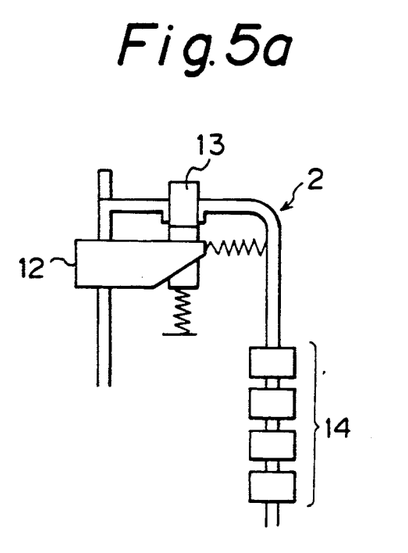
Figure 5B:
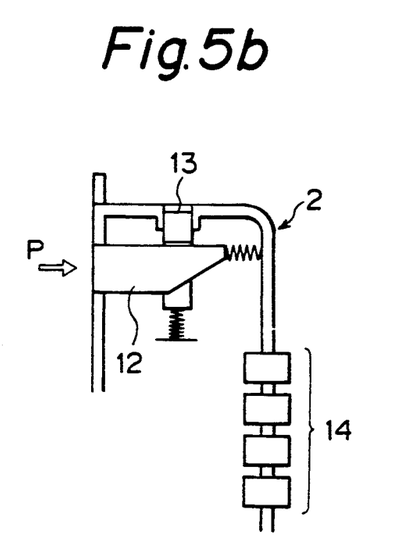

FIGS. 4 and 5 show housing states of the keyboard. FIG. 5a shows a housing state of the keyboard at the normal time of a release button 12. FIG. 5b shows a housing state of the keyboard when the release button 12 is pushed. In FIGS. 5a and 5b, the locking button 13 is disposed on a front side face of the keyboard 2 and is pushed into the keyboard 2 when the release button 12 is pushed. As shown in FIG. 4, at the housing time of the keyboard 2, the locking button 13 is engaged and fixed to a locking groove 19 disposed in the partition panel. The fulcrum of the keyboard at the attaching and detaching times thereof is located in a position deeper than a center of gravity of the keyboard provided when the keyboard 2 is vertically arranged. Accordingly, when the locking button 13 is released, the keyboard is rotated in the direction of an arrow shown in FIG. 4 and falls forward by gravity.

Figure 6:
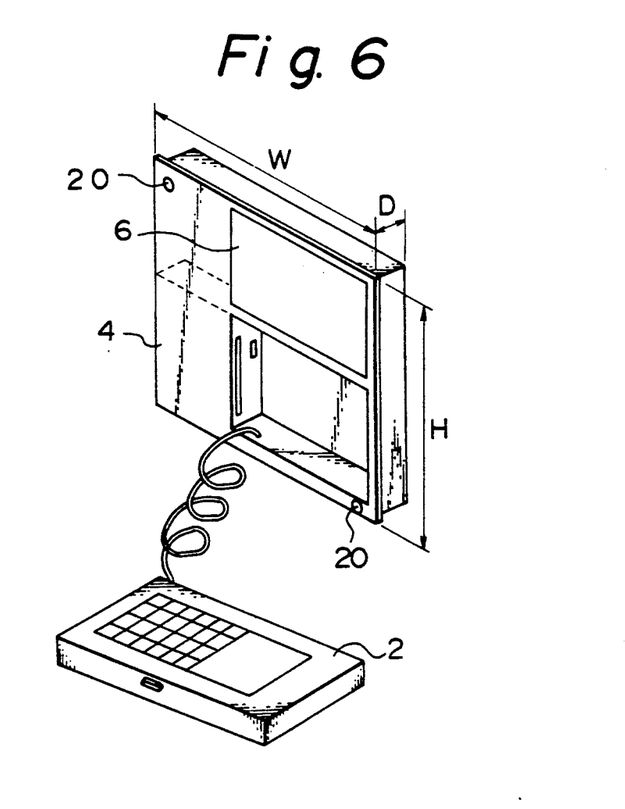
FIGS. 6 and 7 are views showing an integrated office automation unit.
Figure 7:
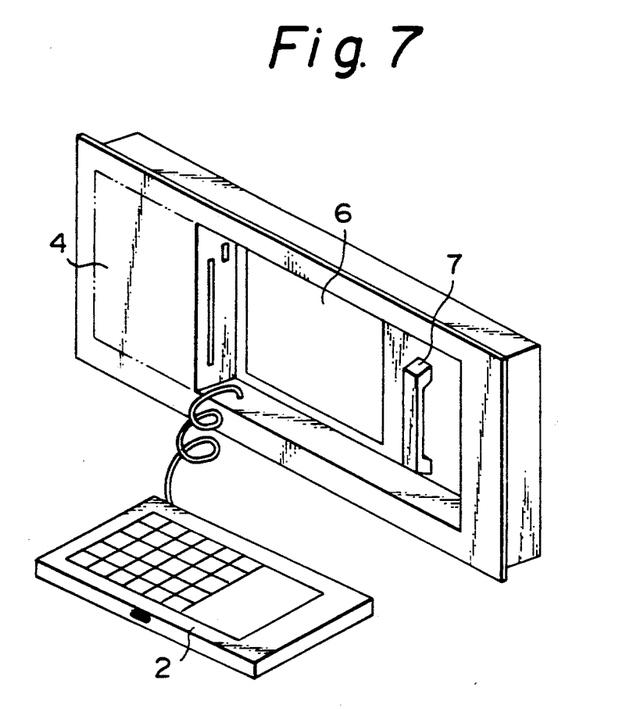

FIGS. 6 and 7 show an office automation unit in which the keyboard, the display and the disk drive unit are integrated with each other. The height (H), width (W) and depth (D) of this unit, the position and diameter of an attachment screw, etc. are standardized. In FIG. 6, a screw hole 20 is disposed to fasten the office automation unit to the partition panel by a screw.

Figure 8:
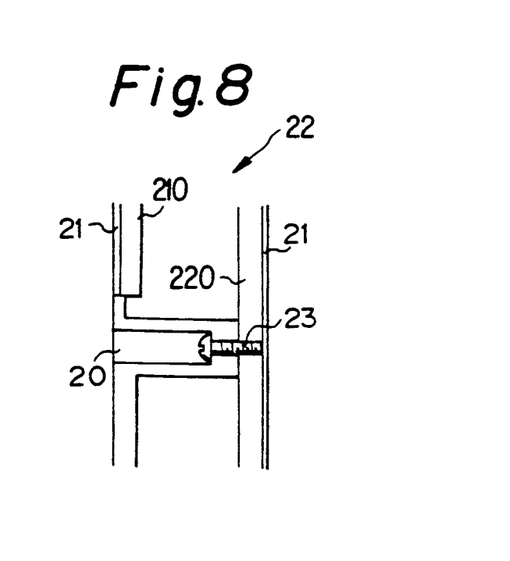
FIG. 8 is a view showing an example in which the office automation unit is attached to the partition apparatus.

FIG. 8 shows an example in which the office automation unit in FIG. 6 is attached to the partition panel. As shown in FIG. 8, the office automation unit is fixed by a screw 23 to a partition panel 22. The first plate 210 and second plate 220 of the partition panel 22 are covered with a decorative sheet 21 so that the screw 23 cannot be seen from the front and rear faces of the partition panel 22.

Figure 9:
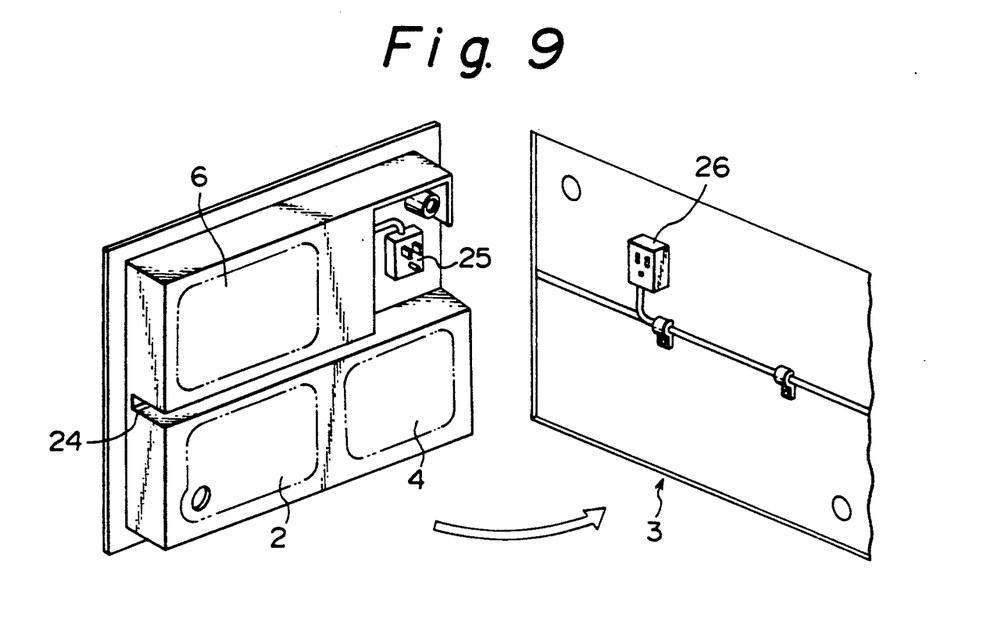
FIG. 9 is view showing an example in which the office automation unit is electrically connected to the partition apparatus.

FIG. 9 shows the structure of the office automation unit in which a relief groove 24 of wiring is disposed in a position corresponding to partition wiring. Further, a power plug 25 is disposed in this office automation unit and a plug socket 26 is disposed in a position of the partition panel 3 corresponding to the position of the power plug 25. Accordingly, when the office automation unit is plugged into an opening section of the partition panel from the front side thereof which is shown as arrow direction in FIG. 9, the power plug 25 and the plug socket 26 can be electrically connected to each other.

As mentioned above, in accordance with the present invention, the following effects can be obtained.

(1) An electronic business machine is housed in a suitable position of the partition panel in the partition apparatus for an OA office in which the electronic business machine is built. Therefore, it is not necessary to arrange this business machine on a desk face so that space can be effectively utilized and no appearance of the partition apparatus is injured.

(2) The electronic business machine such as a keyboard operated on the desk can be easily attached and detached from the partition apparatus and can be used only when necessary and can be housed into the partition apparatus when no business machine is used, thereby effectively utilizing the desk face.

(3) A planar constructional element such as a disk drive unit is arranged in parallel to a flat face of the partition panel so that the partition apparatus can be constructed without increasing the thickness thereof.

(4) Since the electronic business machine such as a keyboard operated on the desk can be housed when no business machine is used, a turning-on operation or driving operation of the business machine can be reliably released at the housing time thereof so that it is possible to prevent an operator from forgetting this releasing operation.

(5) In an equipment using an office automation system, respective devices are integrally constructed in advance and are built in the partition apparatus so that signal lines of the respective devices are easily connected to each other without any connections thereof when the partition panel is built in.

Figure 10:
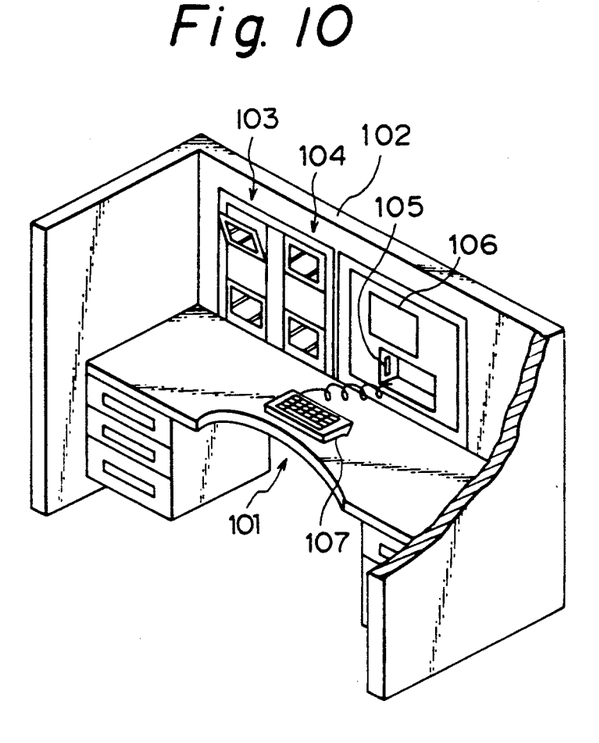
FIG. 10 is a view showing the construction of a partition apparatus for an OA office in a second embodiment of the present invention.

FIG. 10 is a view showing the construction of a partition apparatus for an OA office in a second embodiment of the present invention. In FIG. 10, reference numerals 101 to 107 respectively designate a desk, a partition panel, a scanner, a printer, a disk insertion port, a display and a keyboard. An office automation equipment is arranged and built in a suitable position of the partition panel 102 arranged around the desk 101.

Figure 11:
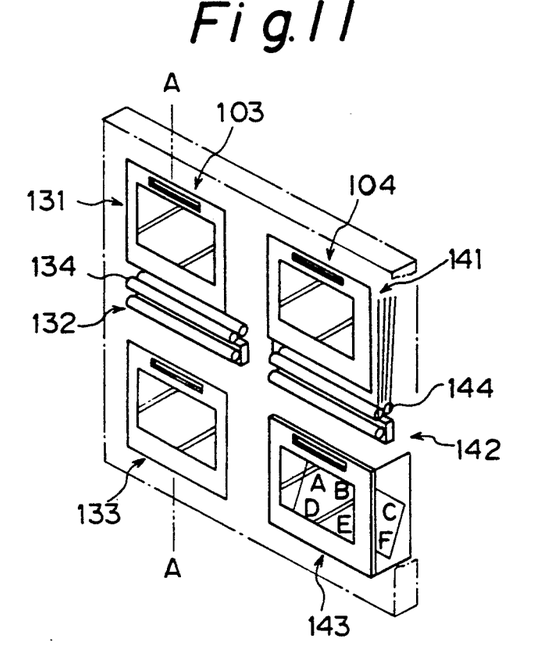
FIG. 11 is an enlarged view of sections for housing a scanner and a printer.

FIG. 11 is an enlarged view of sections for housing the scanner and the printer. In FIG. 11, reference numerals 131 to 134 respectively designate an original setting section, a reading section, an original discharging section and an original feed roller. Further, reference numerals 141 to 144 respectively designate a paper supplying section, a paper supplying roller, a paper discharging section and a paper supplying roller. The original setting section 131, the reading section 132 and the original discharging section 133 are arranged from above in the scanner 103. The paper supplying section 141, the printing section 142 and the paper discharging section 143 are arranged from above in the printer 104. An orginal is read and printed respectively by feeding the original to the original reading section 132 and the printing section 142 by the original feed roller 134 and the paper supplying roller 144. The read and printed originals are respectively discharged and stored in the paper discharging sections 133 and 143 arranged below.

Figure 12:
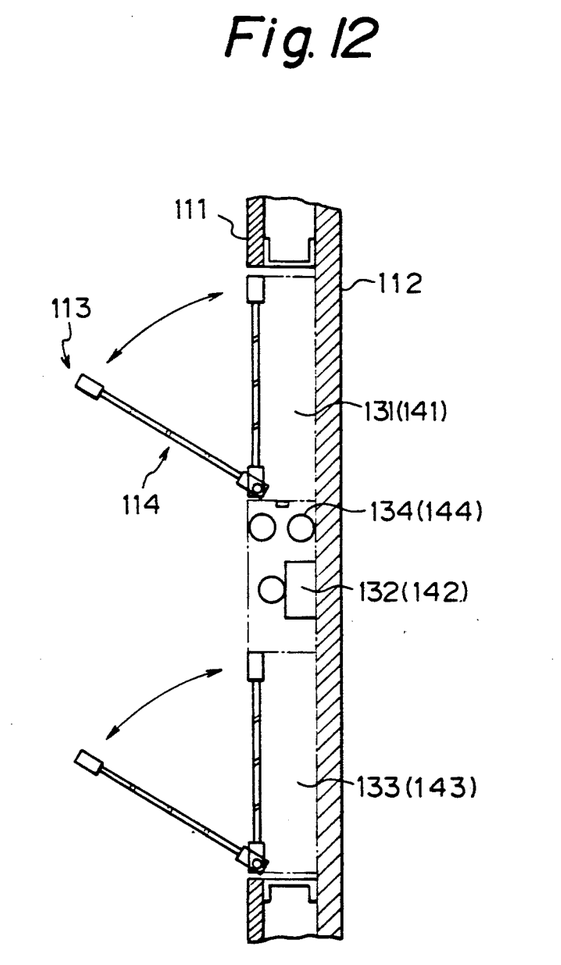
FIG. 12 is a cross-sectional view taken along line A—A of FIG. 11.

FIG. 12 is a cross-sectional view taken along line A—A of FIG. 11. In FIG. 12, reference numerals 111 to 114 respectively designate a front panel, a rear panel, a door and a transparent portion. The original setting section 131 or the paper supplying section 141 has an upper portion constructed as an openable door 113. Each of the paper discharging sections 133 and 143 also has an upper portion constructed as an openable door. A portion of the door 113 is constructed by the transparent portion (glass or opening) 114 such that the interior of the door can be seen from the exterior thereof, thereby confirming a paper setting state or a paper discharging state. The respective sections are built as modules in the partition apparatus. Accordingly, when the original or a supplied sheet of paper is jammed, it is possible to take each of the modules out of the partition apparatus, thereby releasing the jamming state.

Figure 13:
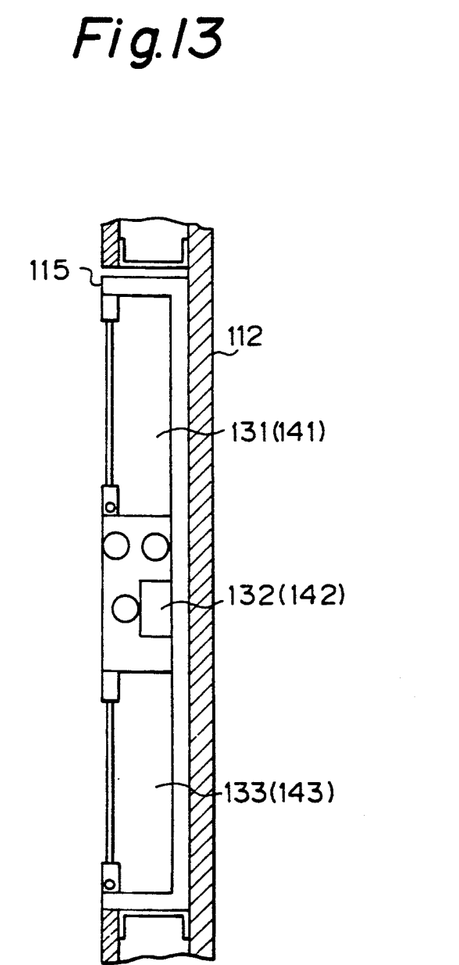
FIG. 13 is a view showing an example in which respective modules are integrated with each other.

FIG. 13 is a view showing an example in which the respective modules are integrated with each other. In such a structure, the integrated modules are constructed as a unit 115 and are built in the partition apparatus and are detached from the partition apparatus as the unit 115 in accordance with necessity.

As mentioned above, the partition apparatus in the second embodiment of the present invention has the following effects.

(1) An office automation equipment for feeding a sheet of paper is arranged such that the sheet of paper is fed from above to below. Accordingly, it is not necessary to compulsorily support the sheet of paper by a feed roller thereof and the sheet of paper can be fed to the feed roller by gravity.

(2) A transparent portion (window) is disposed in the door of a paper supplying or discharging section to confirm the interior thereof so that operations for transmitting and receiving signals can be confirmed without opening the door.

(3) The office automation equipment is constituted by a module every function thereof so that it is possible to take only a required module out of the partition apparatus even when the original or the sheet of paper is jammed at the feeding time thereof.

(4) Since the respective modules are integrally constructed as a unit, the modules are easily built in the partition apparatus and the units can be easily replaced since wiring within the units is performed in advance.

Figure 14:
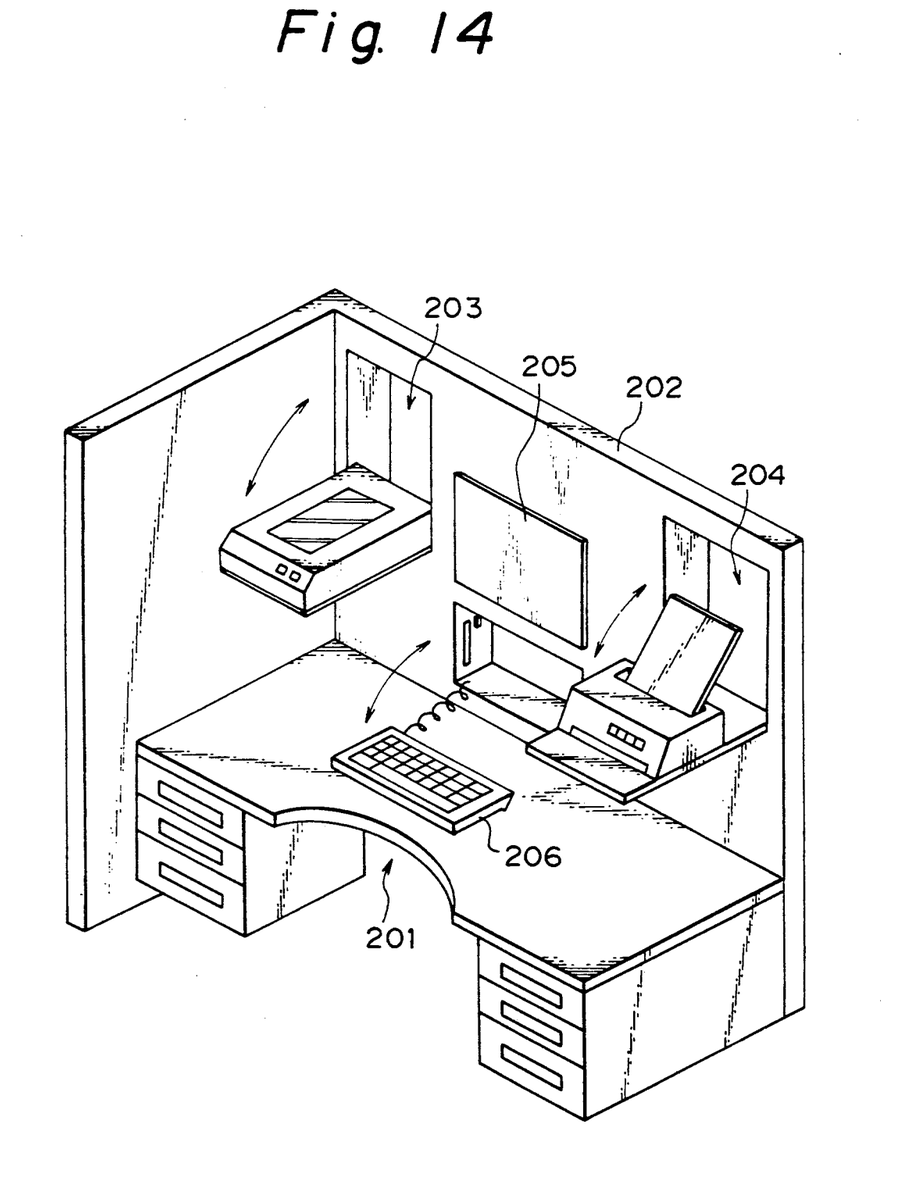
FIG. 14 is a view showing the construction of a partition apparatus for an OA office in a third embodiment of the present invention.

FIG. 14 is a view showing the construction of a partition apparatus for an OA office in a third embodiment of the present invention. In FIG. 14, reference numerals 201 to 206 respectively designate a desk, a partition panel, an image scanner, a printer, a display and a keyboard. The image scanner 203 and the printer 204 built in the partition panel 202 fall forward by pulling a portion of a front panel of the partition apparatus down as shown by an arrow in FIG. 14. The movement of each of the image scanner 203 and the printer 204 is then stopped when a lower portion of the front panel hits against a stopper such that the office automation equipment is approximately arranged horizontally.

Figure 15:
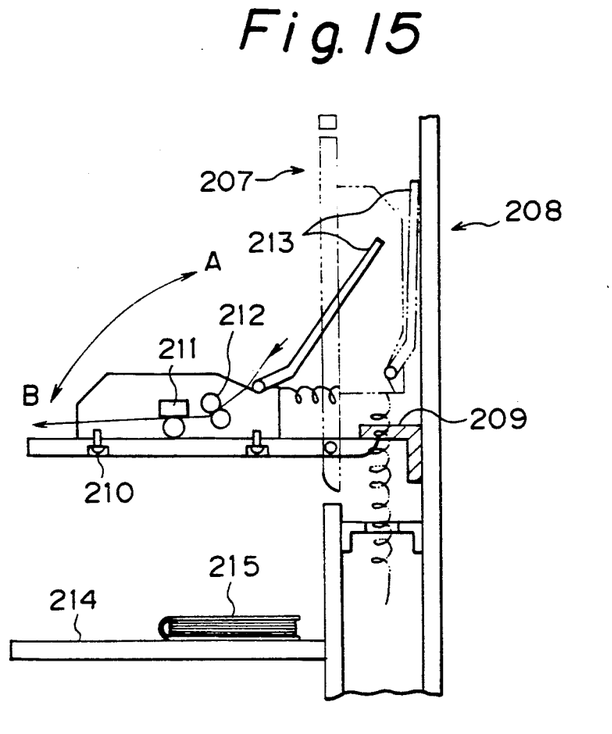
FIG. 15 is a view showing a state in which a partition panel is used as a base.

FIG. 15 is a view showing a state in which the partition panel is used as a base. In FIG. 15, reference numerals 207 to 215 respectively designate a front panel, a rear panel, a stopper, a set screw, a printing section, a paper feed roller, a paper feed guide, a desk roof plate and books. There is a sufficient distance between an upper face of the desk roof plate 214 and the printer section so that some books 215, etc. stacked with each other on the desk are not obstacles to a user. Accordingly, the office automation equipment can be used without arranging the books, etc. on the desk every usage thereof. The paper feed guide 213 for the printer is in a usable state when the front panel is pulled and falls forward as shown by an arrow B in FIG. 15. When the front panel is housed as shown by an arrow A in FIG. 15, the paper feed guide 213 comes in close contact with the body of the partition apparatus with a body side of the printer as a fulcrum. The office automation equipment is fixed to the partition apparatus by the set screw 210 and the partition panel is used as a base.

Figure 16A:
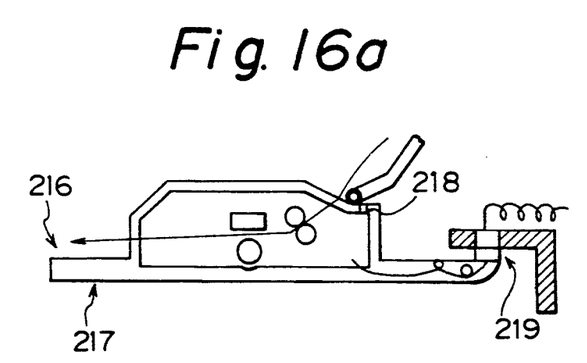
FIGS. 16a and 16b are views showing an example in which a base section of an office automation equipment is integrally formed as a partition panel.
Figure 16B:
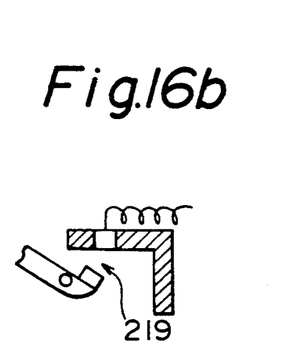

FIGS. 16a and 16b are views showing an example in which the base section of the office automation equipment is integrally formed as the partition panel. In these figures, reference numerals 216 to 219 respectively designate a printing stocker, a base section, a power switch and a connector. In such a structure, it is not necessary to connect the office automation equipment to the partition panel by screws. The power switch 218 is arranged in a place in which the paper feed guide falls at the housing time thereof. An electric current flows through the power switch 218 only when the paper feed guide is opened and hits against the power switch. Otherwise, when the partition apparatus is constructed such that the power switch is turned on only when the office automation equipment is pulled and falls forward, it is possible to reliably prevent the user from forgetting a releasing operation of the power. FIG. 16b is a view showing a disconnecting state of the connector 219.

Figure 17A:
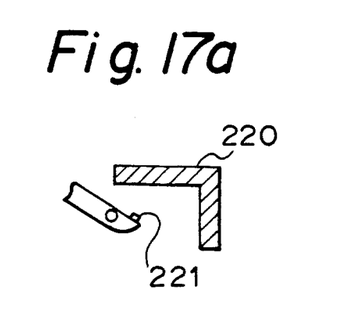
FIGS. 17a and 17b are views showing another example of an attaching position of a power switch.
Figure 17B:
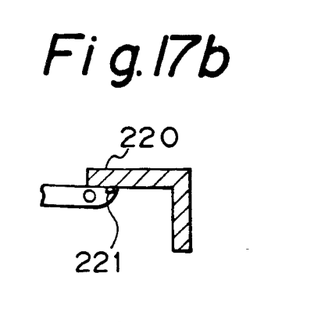

FIGS. 17a and 17b are views showing an example in which a power switch 221 is disposed instead of the connector 219 in FIG. 16 when the power switch is turned off and on, respectively. In these figures, reference numeral 220 designates a stopper. Such a partition apparatus may be constructed such that an electric current flows through the power switch only when the power switch is opened.

As mentioned above, the partition apparatus for an OA office in the third embodiment of the present invention has the following effects.

(1) A portion of a partition panel is fixedly supported in a horizontal direction approximately perpendicular to the partition panel so that this panel portion can be used as a base, thereby effectively utilizing space.

(2) An office automation equipment fixed to the partition panel is housed within the partition apparatus when the office automation equipment is not used, thereby effectively utilizing space.

(3) The horizontal position of the partition panel is higher than that of a roof plate of a desk for an office. Accordingly, even when there are things such as books on this roof plate, they are not obstacles to a user and the user can freely use the partition panel without any restriction in usage such as an arrangement of these things.

(4) Portions projecting from the body of the office automation equipment such as a printer, a paper feed guide, etc. Can be compactly housed into the body of the partition apparatus. Accordingly, the office automation equipment can be housed without increasing the thickness of the partition apparatus. Therefore, space can be effectively utilized without increasing the thickness of the partition apparatus.

(5) The power of the office automation equipment can be turned off at any time by housing the partition panel into the partition apparatus so that it is possible to prevent the user from forgetting the turning-off operation of the power.

Many widely different embodiments of the present invention may be constructed without departing from the spirit and scope of the present invention. It should be understood that the present invention is not limited to the specific embodiments described in the specification, except as defined in the appended claims.

What is claimed is:

1. A partition apparatus for an OA office comprising:
   a partition panel;
   a first plate movably disposed on the side of a front face of the partition panel for constructing a portion of the partition panel;
   a second plate disposed on the side of a rear face of the partition panel for constructing a portion of the partition panel and so as to oppose to said first plate for defining a housing space portion therebetween; and
   means for holding a business machine inside the partition apparatus in a suitable position thereof; and
   wherein said business machine comprises an electronic business machine including a keyboard attached to the first plate so that said keyboard becomes a part of said housing space portion and operated on a desk, and wherein said keyboard can be easily attached and detached from said housing space portion of the partition panel.

2. A partition apparatus as claimed in claim 1, further comprising a port for inserting a disk in a disk drive unit disposed on a side face of the housing space portion.

3. A partition apparatus as claimed in claim 2, wherein a turning-on operation of the business machine is released when the business machine is housed in the housing space portion.

4. A partition apparatus as claimed in claim 1, wherein said business machine comprises an office automation equipment for feeding a sheet of paper arranged and built in said partition panel so as to feed the sheet of paper from above to below.

5. A partition apparatus as claimed in claim 4, wherein functions of the office automation equipment are respectively constructed by modules independently detached from the partition apparatus.

6. A partition apparatus as claimed in claim 5, wherein sections for supplying and discharging the sheet of paper have a door opened from above and a portion of the door is formed as a transparent member or opening.

7. A partition apparatus as claimed in claim 1, wherein said first plate falls forward and is engaged therewith in a horizontal direction approximately perpendicular to the partition panel.

8. A partition apparatus as claimed in claim 7, wherein an office automation equipment is fixed to said partition panel and is housed within the partition apparatus when the partition panel is returned to its original position so as to form a planar face.

* * * * *